United States Patent [19]

Blount

[11] 4,053,757
[45] Oct. 11, 1977

[54] PHOTOFLASH LAMP ARRAY HAVING RADIATION SWITCHES AND FLASH INDICATORS

[75] Inventor: Richard Blount, South Euclid, Ohio

[73] Assignee: General Electric Company, Schenectady, N.Y.

[21] Appl. No.: 639,794

[22] Filed: Dec. 11, 1975

Related U.S. Application Data

[63] Continuation-in-part of Ser. No. 510,323, Sept. 30, 1974, abandoned.

[51] Int. Cl.² .............................................. G03B 15/02
[52] U.S. Cl. .......................................... 362/4; 354/127
[58] Field of Search .................. 431/92, 93, 95, 13; 354/127; 240/1.3, 103 R; 116/114 J

[56] References Cited

U.S. PATENT DOCUMENTS

| | | | |
|---|---|---|---|
| 3,458,270 | 7/1969 | Ganser et al. | 240/1.3 X |
| 3,598,985 | 8/1971 | Harnden et al. | 240/1.3 |
| 3,608,451 | 9/1971 | Kelem | 240/1.3 X |
| 3,609,331 | 9/1971 | Fink et al. | 240/1.3 |
| 3,619,589 | 11/1971 | Hartman | 240/1.3 |
| 3,619,590 | 11/1971 | Meulemans et al. | 240/1.3 |
| 3,666,394 | 5/1972 | Bok et al. | 431/95 |
| 3,714,407 | 1/1973 | Bowers | 240/1.3 |
| 3,739,166 | 6/1973 | Anderson | 240/1.3 |
| 3,774,020 | 11/1973 | Heeman et al. | 240/1.3 |
| 3,894,226 | 7/1975 | Hanson | 240/1.3 |
| 3,937,946 | 2/1976 | Weber | 240/1.3 |

FOREIGN PATENT DOCUMENTS

| | | | |
|---|---|---|---|
| 267,323 | 12/1968 | Austria | 431/95 |
| 255,897 | 7/1967 | Austria | 240/1.3 |
| 1,942,465 | 2/1971 | Germany | |
| 1,192,047 | 4/1965 | Germany | 431/95 |

Primary Examiner—Fred L. Braun
Attorney, Agent, or Firm—Norman C. Fulmer; Lawrence R. Kempton; Frank L. Neuhauser

[57] ABSTRACT

A flash lamp array having a plurality of flash lamps and containing sequencing circuitry having radiation-actuated switches respectively positioned near the upper portions of the lamps, the array also having radiation-actuated flash indicators which are respectively positioned near the lower portions of the lamps.

8 Claims, 7 Drawing Figures

U.S. Patent    Oct. 11, 1977    Sheet 1 of 3    4,053,757
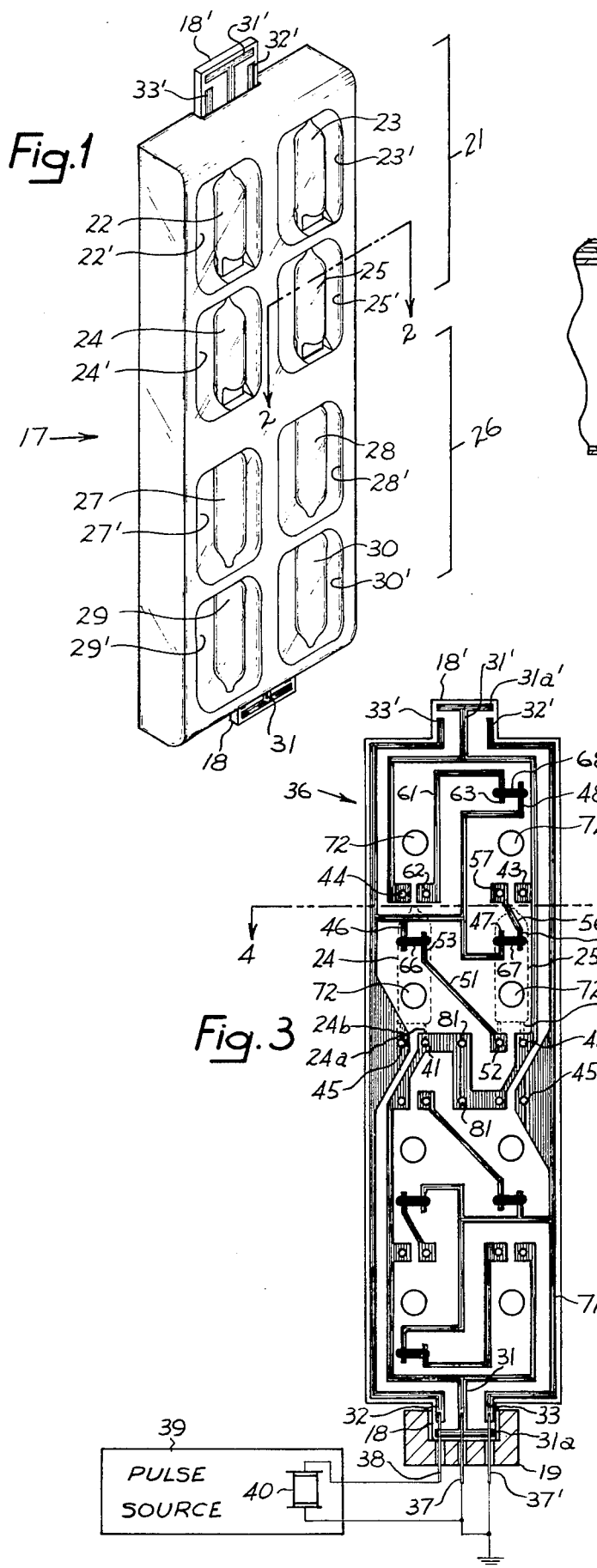
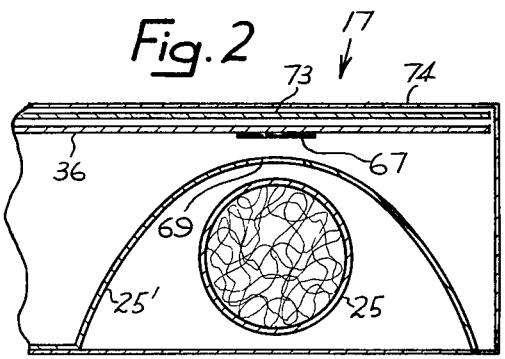
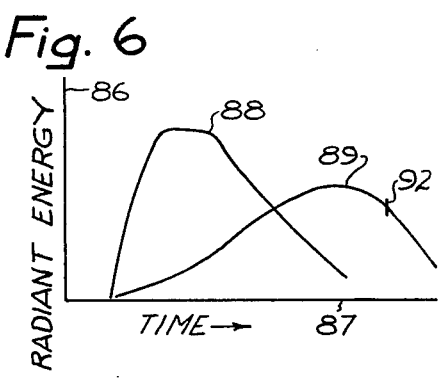
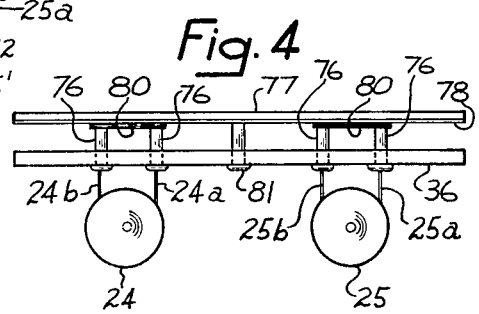

PHOTOFLASH LAMP ARRAY HAVING RADIATION SWITCHES AND FLASH INDICATORS

This is a continuation-in-part of patent application Ser. No. 510,323, filed Sept. 30, 1974, abandoned.

CROSS-REFERENCES TO RELATED APPLICATIONS

Ser. No. 448,671, filed Mar. 6, 1974, Kurt H. Weber, "Multiple Flash Lamp Unit", now U.S. Pat. No. 3,937,946 and assigned the same as this invention.

Ser. No. 485,459, filed July 3, 1974 Richard Blount, "Multiple Flash Lamp Unit", now U.S. Pat. No. 3,952,320 and assigned the same as this invention.

Ser. No. 485,422, filed July 3, 1974, Paul. T. Cote, "Multiple Flash Lamp Unit", now U.S. Pat. No. 3,980,875 and assigned the same as this invention.

Ser. No. 485,460, filed July 3, 1974, Paul T. Cote, "Protective Terminal for Multiple Flash Lamp Unit", now U.S. Pat. No. 3,980,876 and assigned the same as this invention.

Ser. No. 499,316, filed Aug. 21, 1974, Paul T. Cote, "Connector for Photoflash Array", now U.S. Pat. No. 3,912,442 and assigned the same as this invention.

Ser. No. 635,848, filed Nov. 28, 1975, Richard Blount, "Photoflash Array Construction", assigned the same as this invention.

Ser. No. 523,564, filed Nov. 14, 1974, Robert M. Anderson, "Multiple Flashlamp Array", now U.S. Pat. No. 3,956,625 and assigned the same as this invention.

BACKGROUND OF THE INVENTION

The invention is in the field of multiple photoflash lamp units, such as planar arrays.

The above-referenced patent applications disclose multiple flash lamp units that can be connected to a camera in different orientations in each of which a different group of the flash lamps is relatively farther from the camera lens axis than are the other lamps of the unit. The lamps and electrical circuitry are arranged so that in any of the orientations of the unit with respect to the camera, only the group of lamps relatively farther from the lens axis can be flashed. The purpose of such an arrangement is to position the "active" group of flash lamps farther above the camera lens in order to reduce the possibility of a "red-eye" effect that causes the pupils of a person's eyes to appear red or pink in flash pictures taken when the flash lamp is close to the camera lens.

Each of the first six above-referenced multiple flash lamp arrays has, in a preferred embodiment, a circuit board having integral plug-in connector tabs each provided with a plurality of electrical connection terminals in the form of conductive stripes printed on or otherwise attached to the connector tab. The various connector terminals are connected to individual lamps or to sequential firing circuitry carried on the circuit board and interconnected with lamps in the unit. The sequential firing circuitry includes radiation-actuated switches respectively positioned near the lamps (except the last lamp to be flashed), and these switches respond to radiation (heat and light) from an adjacent flashing lamp and connect the next to be flashed lamp into the circuit so that it will be flashed next. The flash arrays have flash indicators in the form of colored areas respectively adjacent the lamps, which are visible from the rear of the array and they change color in response to radiation from an adjacent flashing lamp, thus indicating at a glance which lamps have been flashed and which have not been flashed.

U.S. Pat. No. 3,458,270 to Ganser describes a flash array having radiation-activated switches in a sequencing circuit.

SUMMARY OF THE INVENTION

Objects of the invention are to provide an improved flash lamp array and to provide an array having improved operation of radiation-actuated switches and flash indicators in a manner that is feasible and economical to manufacture.

The invention comprises, briefly and in a preferred embodiment, a multiple flash lamp array having a plurality of flash lamps and containing sequencing circuitry having radiation-actuated switches respectively positioned near the upper portions of the lamps, the array also having radiation flash indicators which are respectively positioned near the lower portions of the lamps.

BRIEF DESCRIPTION OF THE DRAWING

FIG. 1 is a perspective view of a multiple flash lamp array in accordance with a preferred embodiment of the invention.

FIG. 2 is a cross-sectional view of a portion of FIG. 1, taken on the line 2—2 thereof.

FIG. 3 is a front view of a circuit board to which flash lamps are connected in the multiple lamp array, shown plugged into a socket.

FIG. 4 is a cross-sectional view of the circuit board of FIG. 3, taken on the line 4—4 thereof, and also includes flash lamps, connecting eyelets, and a flash indicator sheet.

FIG. 6 is a plot of radiant energy curves of the upper and lower portions of a flashing lamp.

DESCRIPTION OF THE PREFERRED EMBODIMENT

Figure 5:
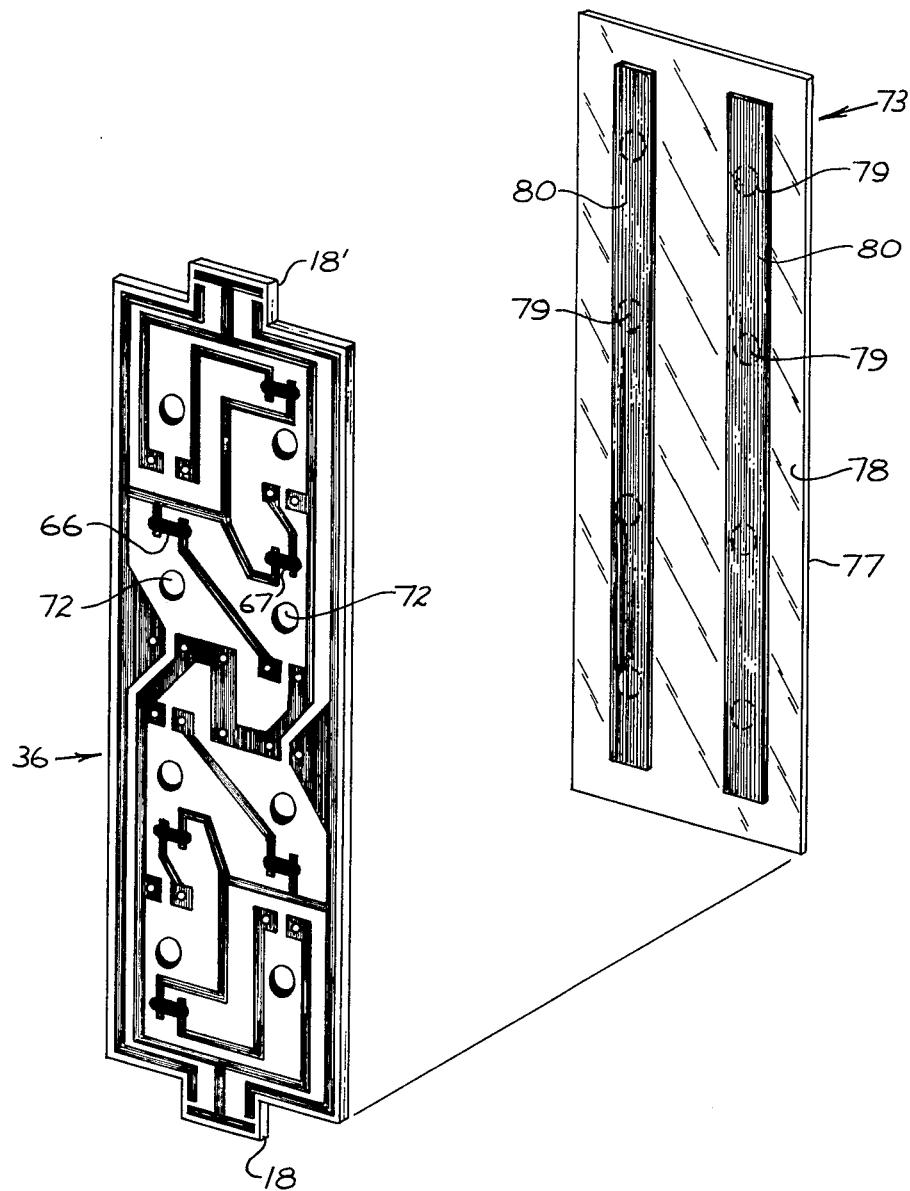
FIG. 5 is an exploded perspective view of the circuit board and flash indicator sheet.
Figure 7:
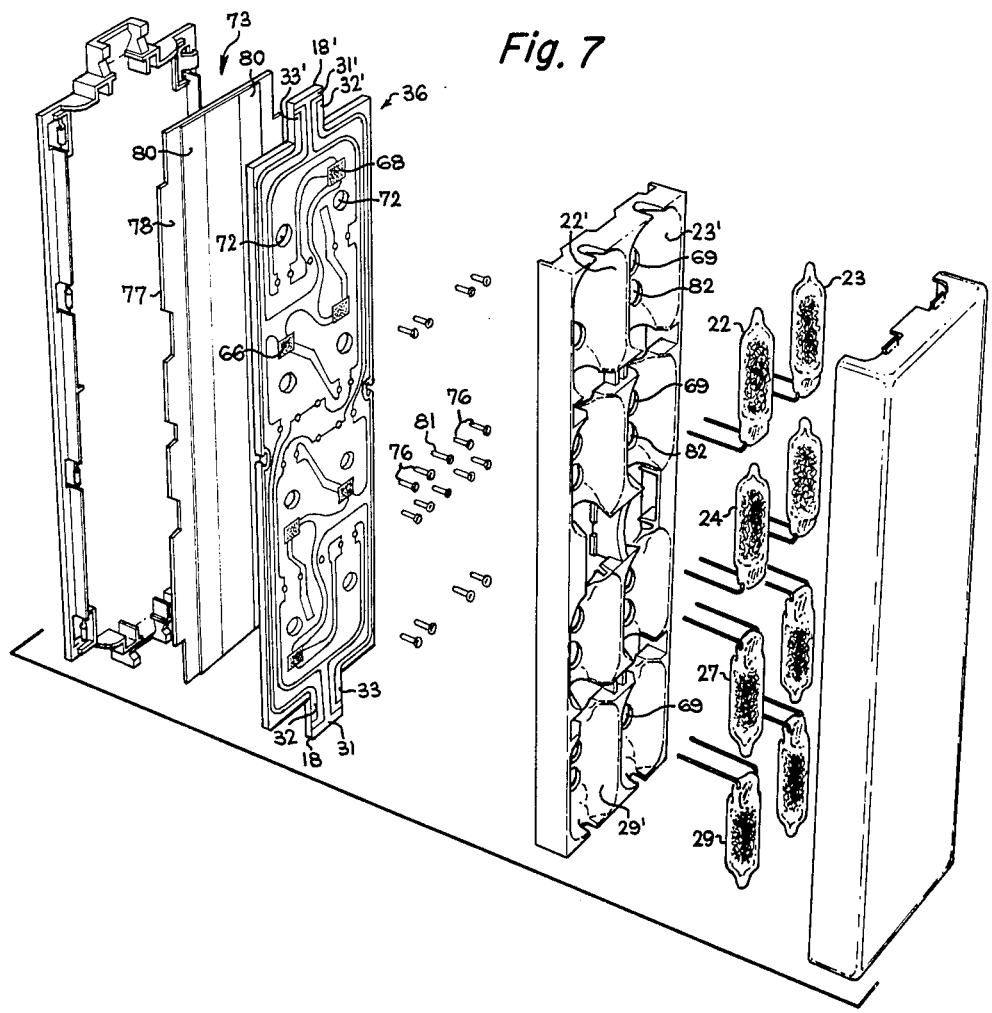
FIG. 7 is an exploded view of a flash array showing features of the invention.

A multiple flash lamp array 17, shown as being of the planar array type and containing a plurality of electrically fired flash lamps, is provided with a plug-in connector tab 18 at the lower side or end thereof, adapted to fit into a socket 19 (FIG. 3) of a camera or flash adapter. The lamp array 17 is provided with a second plug-in connector tab 18' at the top side or end thereof, whereby the array 17 is adapted to be attached to the socket 19 in either of two orientations, i.e., with either the tab 18 or the tab 18' plugged into the socket 19. The array 17 is provided with an upper group 21 of flash lamps 22, 23, 24, and 25, and a lower group 26 of flash lamps 27, 28, 29, and 30. Reflectors 22', etc., are disposed behind the respective flash lamps so that as each lamp is flashed, its light is projected forwardly of the array 17. The relationship of each reflector to its associated lamp, and a suitable plastic housing and transparent front cover, may be as disclosed in the last above-referenced Blount patent application.

With the orientation of the array 17 plugged into the socket 19 as shown in FIG. 3, only the upper four lamps of the array, which constitute the upper group 21, can be flashed, and the four lamps of the lower group 26 are inactive and will not flash. Thus, the above-described undesirable red-eye effect is reduced or eliminated, since the only lamps of the array that can flash are grouped relatively far from the socket 19 and hence from the axis of the camera's lens. The array 17 can be removed from the socket 19, either before or after all lamps of the upper group 21 have been flashed, and turned around, with the upper tab 18' now the lower tab which is inserted into the socket 19, whereupon the group 26 of lamps becomes the upper group, and its lamps are flashed, again reducing or eliminating the red-eye effect because the active lamps are relatively farthest from the socket 19 and hence from the axis of the camera's lens.

Electrical connector terminals are provided at the tabs 18 and 18', and if flash sequencing circuitry is included in the multiple flash unit, for instance as illustrated in FIG. 3, only two electrical terminals, which may be in the form of printed circuit stripes, need be provided on each tab for connecting the upper or active group of lamps to the socket 19. Thus, tab 18 is provided with a pair of electrical terminals 31 and 32, and the tab 18' is provided with a pair of terminals 31' and 32'. Each tab is provided with a third terminal 33 and 33', respectively, which functions in the camera to electrically short the circuitry of the inactive lower group of lamps, as will be described.

FIG. 3 shows a circuit board 36 for the embodiment of FIG. 1 which can be contained within the housing of the unit 17 behind the reflectors 22', etc., and which supports the flash lamps by their lead-in wires and provides for sequential firing of each group of lamps. The plug-in connector tabs 18 and 18' may be formed integrally with the circuit board 36 at opposite ends thereof, as shown. The top and bottom halves of the printed circuitry are reverse mirror images of each other.

The camera socket 19 for the flash unit 17 is provided with a pair of contacts 37 and 38 which respectively electrically engage the terminals 31 and 32 (or 31' and 32') of the flash unit when it is plugged into the socket 19. A third contact 37' is electrically connected to contact 37 and engages the third terminal 33 (or 33') of the circuit board.

A firing pulse source 39, which may be contained within a camera or flash adapter, is connected to the contacts 37 and 38 of the socket 19. The type of firing pulse produced by the source 39 and applied across the contacts 37 and 38 will of course depend on the type of lamps used in the flash unit 17. If low voltage filament types of flash lamps are employed in the unit 17, the firing pulse source 39 may be a battery or battery-capacitor discharge type, producing, in synchronization with opening of the camera shutter, a pulse of approximately 3 volts to 15 volts or more and of sufficient energy to fire a single flash lamp. An example of a low voltage flash lamp is disclosed in U.S. Pat. No. 3,506,385 to Kurt Weber and George Cressman, and an example of a low voltage flash sequencing circuit is disclosed in U.S. Pat. No. 3,532,931 to Paul Cote and John Harnden. If the flash lamps in the multiple flash unit 17 are of the so-called high voltage type, requiring a pulse of approximately 1000 or 2000 volts or more for example, the firing pulse source 39 may comprise a suitable battery-capacitor discharge and voltage step-up transformer type of circuit, or preferably may employ a compact piezoelectric element 40 arranged to be impacted or stressed in synchronization with opening of the camera shutter, so as to produce a firing pulse having a voltage of approximately 1000 or 2000 volts or more and of sufficient energy to fire a single flash lamp. An example of a high voltage flash lamp and a firing pulse source comprising a piezoelectric element synchronized with a camera shutter is described in U.S. Pat. Nos. 2,972,937 and 3,106,080 to C. G. Suits.

The center terminal 31 includes a portion 31a extending laterally across the tab between its end and the terminals 32 and 33, as is more fully disclosed in the above-referenced Cote patent application Ser. No. 485,460, and which functions to reduce the possibility of lamps being flashed by electrostatic charge when the tab 18 is grasped or comes into contact with another object and which also functions, when the tab 18 is being plugged into the socket 19, to temporarily short out and discharge any residual voltage of the firing pulse source 39. Similarly, the terminal 31' includes a lateral portion 31a'.

The circuit board 36 in FIG. 3 is shown in the orientation in which the connector tab 18 faces downwardly and is plugged into the socket 19, whereby the circuit board terminals 31, 32, and 33 respectively make electrical contact with the socket contacts 37, 38, and 37'. The contacts 37' and 38 are shaped so as not to contact the lateral terminal portion 31a when the array is fully plugged into the socket. The circuit board terminal 31 is part of a continuous conductor run on the board, which is connected in common to one electrical lead wire (22a, 23a, 24a, etc.) of each of the eight flash lamps 22, 23, 24, etc., in the unit at points 41, 42, 43, 44, etc., by suitable means such as soldering, welding, or crimping. For the sake of clarity, only two flash lamps 24 and 25 are shown in FIG. 3, and in dashed lines. Suitable openings are provided through the reflectors at the bases of the lamps to permit the connections of the lead-in wires to the circuit board.

The circuit board terminal 32 is part of a conductor run that is connected to lead-in wire 24b of lamp 24 at point 45, and terminates at radiation switch terminals 46, 47, and 48 respectively positioned near lamps 24, 25, and 23. A circuit board conductor run 51 is connected to the remaining lead wire of flash lamp 25 at 52, and terminates at a radiation switch terminal 53 which is near to but spaced from radiation switch terminal 46. A circuit board conductor run 56 is connected to the remaining lead-in wire of flash lamp 23 at point 57, and terminates at a radiation switch terminal 58 which is near to but spaced from radiation switch terminal 47. Similarly, a circuit board conductor run 61 is connected to the remaining lead-in wire of flash lamp 22 at point 62, and terminates at a radiation switch terminal 63 which is near to but spaced from the radiation switch terminal 48.

Radiation switches 66, 67, and 68 are respectively positioned to be in contact with and bridge across the respective pairs of switch terminals 46–53, 47–58, and 48–63. The material for the radiation switches 66, 67, and 68 may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches 66, 67, and 68 is respectively positioned behind and near to a flash lamp 24, 25, 23. Window means in the form of transparent sections or openings 69 may be provided in the reflectors in front of the switches as shown in FIG. 2 to facilitate radiation transfer. A suitable material for the radiation switches 66–68 is silver oxide dispersed in a binder such as polyvinyl resin. Each of these radiation switches, upon receiving radiation from the adjacent lamp when it is flashed, changes from an open circuit or high resistance to a closed circuit or low resistance between its switch terminals on the circuit board. The terminal 33 on the plug-in tab 18 is connected, via a printed circuit run 71, to the connection point 45' for lamp 28, which is the first lamp to be flashed when the array is turned around so that terminals 31' and 32' are connected to the firing pulse source 39 via the socket 19. Since the socket contacts 37 and 37' are electrically shorted together, they electrically short together the tab terminals 31 and 33, also at the same time shorting terminals 31' and 32' of the inactive lower group of lamps, thus electrically shorting the input of the circuitry for the inactive group of lamps. Similarly, when the unit is turned around, the socket contacts 37 and 37' will electrically short the terminals 31' and 33' and also terminals 31 and 32, thus shorting the input of the then inactive lamp circuit. This shorting of the inactive lamp circuit prevents accidental flashing of an inactive lamp by stray capacitive coupling of a firing pulse, as is described in detail in the first above-referenced Blount patent application. Of course, this precaution is useful only when the inactive lamps have not yet been flashed, and is not necessary if they have already been flashed.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into the socket 19, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit of FIG. 3 functions as follows. Assuming that none of the four lamps in the upper half of the unit 17 have been flashed, upon occurrence of a first firing pulse from the source 39, this pulse will be directly applied to the lead-in wires of the first-connected flash lamp 24, whereupon the lamp 24 flashes and becomes an open circuit between its lead-in wires. Heat and light radiation from the flashing first lamp 24 causes the adjacent radiation switch 66 to become a closed circuit between terminals 46 and 53 (or a low value of resistance), thereby connecting the circuit board terminal 32 electrically to the lead-in wire of the second lamp 25 at point 52. By the time this occurs, the firing pulse has diminished to a value insufficient to cause the second lamp 25 to flash. When the next firing pulse occurs, it is applied to the lead-in wires of the second lamp 25, via the now closed radiation switch 66, whereupon the second lamp 25 flashes, thereby causing radiation switch 67 to assume zero or low resistance, and the second lamp 25 now has an open circuit or high resistance between its lead-in wires. When the next firing pulse occurs, it is applied via now closed radiation switch 67 to the third lamp 23 via its lead-in wires which are connected to the printed circuit at points 43 and 57, thereby firing the lamp which becomes an open circuit, and the radiation from it causes the radiation switch 68 to become essentially a closed circuit across its terminals. Thus, the next firing pulse will be applied, via now closed radiation switch 68, to the lead-in wires of the fourth flash lamp 22 which are connected to the circuit at points 44 and 62, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around and the other connector tab 18' attached to the socket 19, the group of lamps that then become uppermost and relatively farthest away from the lens axis will be in an active circuit and will be flashed in the same manner as has been described.

Window means which may be in the form of openings 72 are provided through the circuit board 36 to permit radiation from a flashing lamp to change the color of a radiation-sensitive plastic carried on a flash indicator sheet 73 positioned behind the circuit board and visible through a transparent back 74 of the array housing, thus indicating at a glance which lamps have, and have not, been flashed, as is described in further detail in the second above-referenced Blount patent application. In a preferred construction, shown in FIGS. 4 and 5, eyelets 76 are positioned through openings in the circuit board 36 at the points 41, 42, etc., where the lamp lead-in wires 22a, 22b, etc., are to be attached. The heads of the eyelets 76 are in contact with circuit runs on the board, and the other ends of the eyelets project slightly from the back of the board and are soldered or crimped to the lead-in wires, thus attaching the lamps electrically and mechanically to the circuit board. The flash indicator sheet 73 may comprise a sheet of paper 77 covered with metal 78, provided with openings 79 respectively behind and in alignment with the openings 72 in the circuit board 36. Strips 80 of heat-sensitive plastic, such as biaxially oriented polypropylene, are glued or otherwise attached to the metal foil 78, and cover the openings 79 and are visible through the openings 79 from the rear of the array. The heat-sensitive plastic 80 shrinks or melts when subjected to radiant energy from an adjacent flashing lamp thus effectively changing the color of the openings 79. Preferably, the openings 69 through the reflectors in alignment with the switches 67, etc., are large enough to overlie the openings 72 through the circuit board 36, or additional openings 82 are provided through the reflectors in alignment with the circuit board openings 72, to facilitate radiation transfer from a flashing lamp to the flash indicator material 80 at the opening 79 behind the lamp. In a preferred embodiment, the flash indicator material is colored (green, for example) by ink or other suitable means on its back side which is visible through the openings 79 and the transparent back 74 of the array. The color disappears and the opening becomes a different color (dark, for example) when the plastic shrinks or melts away at the opening due to radiation from the adjacent flashing lamp. The front of the plastic (toward the lamps) should be coated with dark ink so as to absorb heat and light radiation more readily. The entire flash indicator sheet 73 could comprise a single sheet of radiation-sensitive plastic, and the openings 72 through an opaque circuit board would confine the radiation and hence the flash indication to an area behind the respective lamps. Like the window means 69 in the reflectors, the window means 72 in the reflectors and circuit board in front of the flash indicators may be either transparent sections, or openings, or a combination thereof. The circuit board 36 can be of transparent plastic so as to provide the window means. "Transparent" is intended to mean that the window means are sufficiently transparent to radiation of flashing lamps so that sufficient radiation will pass therethrough to actuate the switches and/or flash indicators. Openings are the preferred form of the window means, so as to insure the transmission of sufficient radiation from flashing lamps to actuate any relatively less sensitive switches and flash indicators.

As shown in FIG. 4, one or more eyelets 81 are positioned through openings in the circuit board at an electrical ground circuit run, with their heads in contact with the electrical ground circuit run and their other ends touching the metal foil 78 so that it is connected to electrical ground of the sequencing circuit and functions as a shield to reduce the possibility of undesired accidental flashing of lamps by electrostatic voltage charges. The plastic indicator strips 80 serve as electrical insulation to prevent shorting of the lamp connection eyelets 76 by the metal foil 78.

In accordance with the invention, the switch (67, for example) and flash indicator (located as determined by the openings 72 through the circuit board and 79 through the flash indicator sheet) associated with each lamp are positioned one above the other, as shown, the switch being relatively higher along the lamp than is the flash indicator. Preferably, the switch is positioned adjacent to the upper portion of the lamp and the flash indicator is positioned adjacent to the lower portion of the lamp, these terms referring to the intended normal vertical operating position of the lamp when flashed. Of the numerous ways of relatively positioning the switch and flash indicator with respect to the lamp, such as side by side, above the lamp, at opposite sides of the lamp, etc., the above-described arrangement of the invention achieves advantages as will now be described with reference to FIG. 6.

In FIG. 6, the vertical axis 86 represents radiant energy produced by a flashing lamp, and the horizontal axis 87 represents time during the flashing. The curve 88 illustrates representative radiant energy produced by the lamp adjacent to its upper portion, where the switch is located, during flashing thereof, and the curve 89 illustrates representative relative radiant energy produced by the same lamp adjacent to its lower portion, where the flash indicator is located, during the same flash. As is indicated by these curves, the upper portion of a flashing lamp generates more radiation (heat and light), and more quickly, than the lower portion of the lamp. This is partly due to heat-rise effect in the flashing lamp, and the delayed peak of radiation generation at the lower portion of the lamp is partly due to falling hot burned metal debris in the lamp. By locating the sequencing switch adjacent to the relatively greater radiant energy portion of a flashing lamp, reliability is increased in array functioning because the switch will be most likely to be actuated properly by the flashing lamp. It is considered more important to insure proper switch functioning than proper flash indicator functioning, to assure continued functioning of the sequencing circuit until all of the lamps are flashed; whereas, if a flash indicator should fail to function, the array will still continue to properly flash the lamps. By locating the flash indicator adjacent to the lower portion of the lamp, it becomes actuated relatively late during the lamp flashing, for example at the time indicated by numeral 92, and by this time, very little or no light is being produced by the flashing lamp so that when the flash indicator shrinks or melts away there will be less light visible at the opening 79 of the flash indicator than if the flash indicator and switch positions were reversed. If the flash indicator were located near the high-radiation upper portion of a flashing lamp, as would seem to be the best location for it, some people might be alarmed or concerned at seeing a spot of bright light that might occur at the flash indicator opening if the indicator material shrinks or melts away while the flashing lamp is producing light. This is most likely to occur if the flash indicator plastic is very thin and is a fast-melting material.

It has been found that the invention achieves its objective of providing improved functioning of radiation switches and flash indicators in a flash lamp array, and does so in a manner that is feasible and economical to manufacture.

The terms "radiant energy" and "radiation", as used herein, denote energy in the form of light and heat radiated from a flashing lamp. This includes a combination of heat alone, light alone, and light accompanied by heat. The switches 67, etc., and the flash indicator material 80 are activated by a combination of heat radiated by a flashing lamp and heat generated internally of the switch and flash indicator by the intense light impinging thereon.

While preferred embodiments of the invention have been shown and described, various other embodiments and modifications thereof will become apparent to persons skilled in the art, and will fall within the scope of the invention as defined in the following claims.

What I claim as new and desire to secure by Letters Patent of the U.S. is:

1. A flash lamp array comprising a plurality of flash lamps and sequencing circuitry for sequentially flashing said lamps, said array being provided with connector means for receiving lamp-firing electrical signals, each of said flash lamps comprising a tubular-like envelope having an end thereof generally facing toward said connector means, said sequencing circuitry comprising a radiation-actuated switch, said array being provided with a flash indicator comprising a radiation-sensitive material, said switch and said flash indicator being located adjacent to the side of said flash lamp with said switch relatively farther than said flash indicator from said connector means, said array further including a circuit board carrying said sequencing circuitry on a side thereof, said lamps being positioned over said side of the board and having lead-in wires connected to said circuitry, said radiation-actuated switch being carried on said side of the circuit board and being connected in said sequencing circuitry, said flash indicator being positioned behind the other side of said circuit board, and window means through said circuit board for permitting radiant energy from said lamp when flashed to impinge upon said flash indicator.

2. A flash array as claimed in claim 1, in which said window means comprises an opening.

3. A flash array as claimed in claim 1, further including a reflector member positioned between said lamps and said circuit board and provided with first window means in alignment with said switch and second window means in alignment with said window means of the circuit board.

4. A flash array as claimed in claim 3, in which said first and second window means of the reflector member comprise openings.

5. A flash lamp array comprising a plurality of flash lamps and sequencing circuitry for sequentially flashing said lamps, each of said lamps comprising a tubular-like envelope and lead-in conductors sealed into said envelope at a base end thereof, said sequencing circuitry comprising a radiation-actuated switch positioned adjacent to one of said flash lamps, said array being provided with a flash indicator comprising a radiation-sensitive material, said switch and said flash indicator being located adjacent to the side of said flash lamp with said switch relatively farther than said flash indicator from said base end of the lamp, said array further including a circuit board carrying said sequencing circuitry on a side thereof, said lamps being positioned over said side of the board and having lead-in wires connected to said circuitry, said radiation-actuated switch being carried on said side of the circuit board and being connected in said sequencing circuitry, said flash indicator being positioned behind the other side of said circuit board, and window means through said circuit board for permitting radiant energy from said lamp when flashed to impinge upon said flash indicator.

6. A flash array as claimed in claim 5, in which said window means comprises an opening.

7. A flash array as claimed in claim 5, further including a reflector member positioned between said lamps and said circuit board and provided with first window means in alignment with said switch and second window means in alignment with said window means of the circuit board.

8. A flash array as claimed in claim 7, in which said first and second window means of the reflector member comprise openings.

* * * * *